(12) United States Patent
Yunusov et al.

(10) Patent No.: US 11,503,464 B2
(45) Date of Patent: Nov. 15, 2022

(54) SPATIAL PHYSICAL LAYER SECURITY IN WIRELESS COMMUNICATION SYSTEMS

(71) Applicant: QUALCOMM Incorporated, San Diego, CA (US)

(72) Inventors: David Yunusov, Holon (IL); Assaf Touboul, Netanya (IL); Shay Landis, Hod Hasharon (IL); Gideon Kutz, Ramat Hasharon (IL); Amit Bar-Or Tillinger, Tel-Aviv (IL); Moshe Ben-Ari, Rehovot (IL); Peer Berger, Hod Hasharon (IL)

(73) Assignee: QUALCOMM Incorporated, San Diego, CA (US)

(*) Notice: Subject to any disclaimer, the term of this patent is extended or adjusted under 35 U.S.C. 154(b) by 42 days.

(21) Appl. No.: 17/125,441

(22) Filed: Dec. 17, 2020

(65) Prior Publication Data

US 2022/0201471 A1   Jun. 23, 2022

(51) Int. Cl.
| | | |
|---|---|---|
| *H04M 1/66* | (2006.01) | |
| *H04M 1/68* | (2006.01) | |
| *H04M 3/16* | (2006.01) | |
| *H04W 12/0431* | (2021.01) | |
| *H04W 12/033* | (2021.01) | |
| *H04B 7/0413* | (2017.01) | |
| *H04W 12/08* | (2021.01) | |
| *H04W 12/102* | (2021.01) | |

(52) U.S. Cl.
CPC ...... *H04W 12/0431* (2021.01); *H04B 7/0413* (2013.01); *H04W 12/033* (2021.01); *H04W 12/08* (2013.01); *H04W 12/102* (2021.01)

(58) Field of Classification Search
CPC .......... H04W 12/0431; H04W 12/033; H04W 12/08; H04W 12/102; H04B 7/0413
USPC ....................................................... 455/411
See application file for complete search history.

(56) References Cited

U.S. PATENT DOCUMENTS 11,271,699 B1 * 3/2022 Eyuboglu ............... H04L 41/16
2020/0044840 A1 * 2/2020 Chang .................. H04L 9/0822

* cited by examiner

*Primary Examiner* — Tanmay K Shah
(74) *Attorney, Agent, or Firm* — Patterson & Sheridan, L.L.P/Qualcomm Incorporated (57) ABSTRACT

Certain aspects of the present disclosure provide techniques for wireless communication by a first wireless device. The first wireless device may participate in a beam forming procedure with a second wireless device to evaluate a plurality of transmit (TX) and receive (RX) beam pairs. The first wireless device may select one of the TX and RX beam pairs based on the evaluation. The first wireless device may determine at least one cryptographic key based on channel parameters associated with a selected one of the TX and RX beam pairs. The first wireless device may use the at least one cryptographic key for communications with the second wireless device.

24 Claims, 7 Drawing Sheets

SPATIAL PHYSICAL LAYER SECURITY IN WIRELESS COMMUNICATION SYSTEMS

BACKGROUND

Field of the Disclosure

Aspects of the present disclosure relate to wireless communications and, more particularly, to techniques for determining cryptographic keys based on channel parameters associated with one of transmit (TX) and receive (RX) beam pairs between two wireless devices.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd generation partnership project (3GPP) long term evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. The NR is a set of enhancements to the LTE mobile standard promulgated by the 3GPP. The NR is designed to better support mobile broadband Internet access by improving spectral efficiency, lowering costs, improving services, making use of new spectrum, and better integrating with other open standards using the OFDMA with a cyclic prefix (CP) on a downlink (DL) and on an uplink (UL). To these ends, the NR supports beam forming, multiple-input multiple-output (MIMO) antenna technology, and carrier aggregation.

However, as the demand for mobile broadband access continues to increase, there exists a need for further improvements in the NR and the LTE technology. Preferably, these improvements should be applicable to other multi-access technologies and the telecommunication standards that employ these technologies.

SUMMARY

Systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved techniques for each wireless device to generate a cryptographic key over a wireless channel based on channel parameters without a need to share the cryptographic key with other wireless devices.

Certain aspects of the subject matter described in this disclosure can be implemented in a method for wireless communication by a first wireless device. The method generally includes participating in a beam forming procedure with a second wireless device to evaluate a plurality of transmit (TX) and receive (RX) beam pairs, each TX and RX beam pair have different associating channel parameters, determining at least one cryptographic key based on channel parameters associated with a selected one of the TX and RX beam pairs, and using the at least one cryptographic key for communications with the second wireless device.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for wireless communication between wireless devices. A first wireless device may participate in a beam forming procedure with a second wireless device to evaluate a plurality of transmit (TX) and receive (RX) beam pairs. The first wireless device may select one of the TX and RX beam pairs based on the evaluation. The first wireless device may determine a cryptographic key based on channel parameters associated with a selected one of the TX and RX beam pairs. The first wireless device may use the cryptographic key for communications with the second wireless device.

The following description provides examples of techniques for determining a cryptographic key based on channel parameters associated with a channel between two wireless devices, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G new radio (NR)) wireless technologies, aspects of the present disclosure can be applied in other generation-based communication systems.

NR access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beam forming and beam direction may be dynamically configured. Multiple-input multiple-output (MIMO) transmissions with precoding may also be supported. MIMO configurations in a downlink may support up to 8 transmit antennas with multi-layer downlink transmissions up to 8 streams and up to 2 streams per UE. Multi-layer transmissions with up to 2 streams per UE may be supported. Aggregation of multiple cells may be supported with up to 8 serving cells.

Example Telecommunications System

Figure 1:
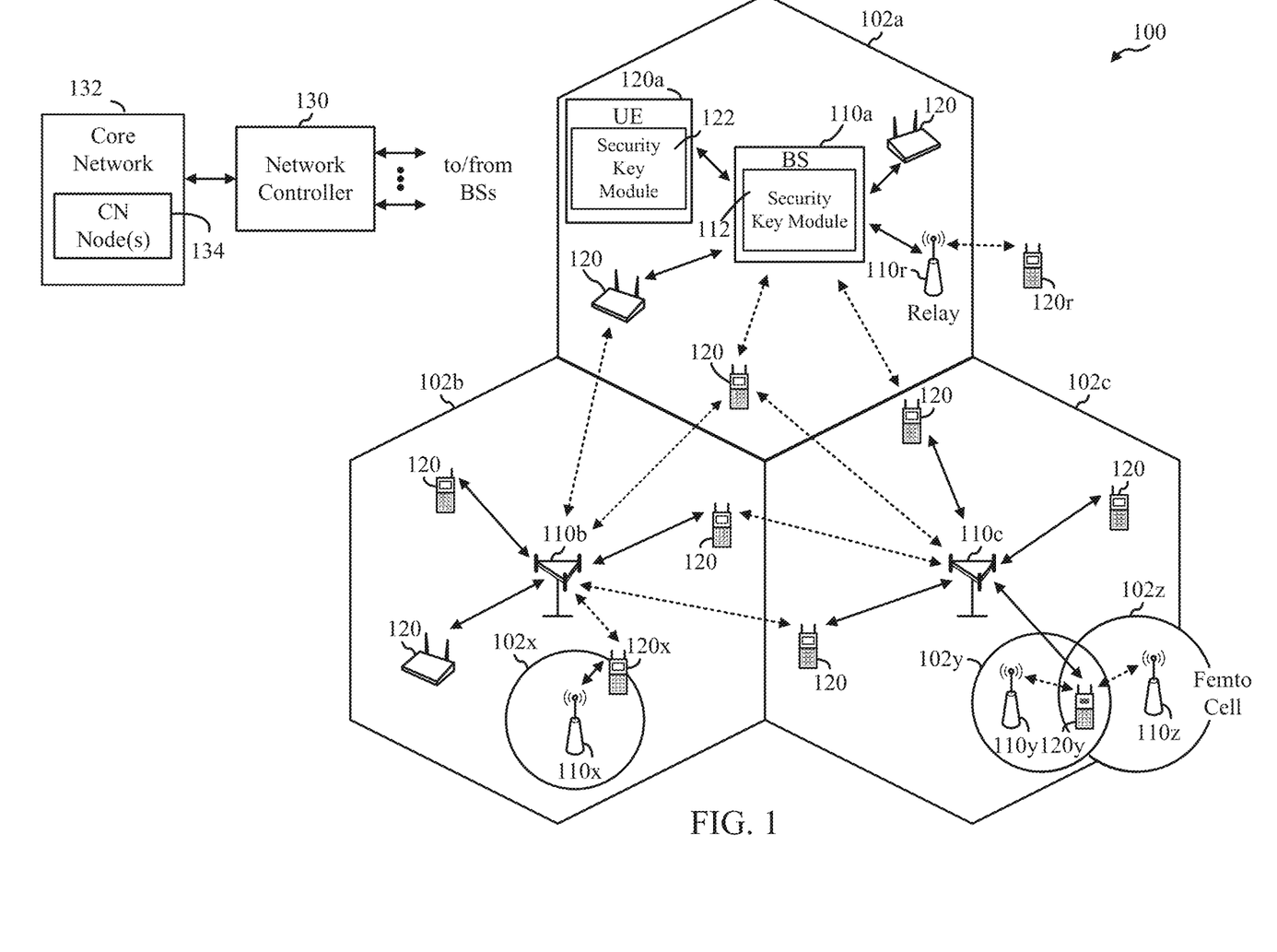
FIG. 1 is a block diagram conceptually illustrating an example wireless communication network, in accordance with certain aspects of the present disclosure.

FIG. 1 illustrates an example wireless communication network 100, in which aspects of the present disclosure may be practiced. For example, the wireless communication network 100 may include one or more base stations (BSs) 110a (with a security key module 112) configured to perform operations 500 of FIG. 5. The wireless communication network 100 may further include one or more user equipments (UEs) 120a (with a security key module 122) configured to perform operations 500 of FIG. 5.

The wireless communication network 100 is in communication with a core network 132. The core network 132 is in communication with the one or more BSs 110 and/or the one or more UEs 120 in the wireless communication network 100, via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 may communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

The network controller 130 may be in communication with a set of BSs 110 and provide coordination and control for these BSs 110 (e.g., via a backhaul). In aspects, the network controller 130 may be in communication with the core network 132 (e.g., a 5G Core Network (5GC)), which provides various network functions such as access and mobility management, session management, user plane function, policy control function, authentication server function, unified data management, application function, network exposure function, network repository function, network slice selection function, etc.

The wireless communication network 100 may include relay stations (not shown). A relay station is a station that receives a transmission of data and/or other information from an upstream station (e.g., the BS 110 or the UE 120) and sends a transmission of the data and/or other information to a downstream station (e.g., the UE 120 or the BS 110). The relay station may also be the UE 120 that relays transmissions for other UEs 120. In the example shown in FIG. 1, a relay station may communicate with the BS 110a and a UE 120r in order to facilitate communication between the BS 110a and the UE 120r. The relay station may also be referred to as an IAB node, a relay AP, a relay, etc.

The wireless communication network 100 may be a heterogeneous network that includes BSs 110 of different types, e.g., macro AP, pico AP, femto AP, relays, etc. These different types of BSs 110 may have different transmit power levels, different coverage areas, and different impact on interference in the wireless communication network 100. For example, the macro AP may have a high transmit power level (e.g., 20 Watts) whereas the pico AP, the femto AP, and the relays may have a lower transmit power level (e.g., 1 Watt).

The wireless communication network 100 may support synchronous or asynchronous operation. For synchronous operation, the BSs 110 may have similar frame timing, and transmissions from the different BSs 110 may be approximately aligned in time. For asynchronous operation, the BSs 110 may have different frame timing, and transmissions from the different BSs 110 may not be aligned in time. The techniques described herein may be used for both synchronous and asynchronous operation.

Figure 2:
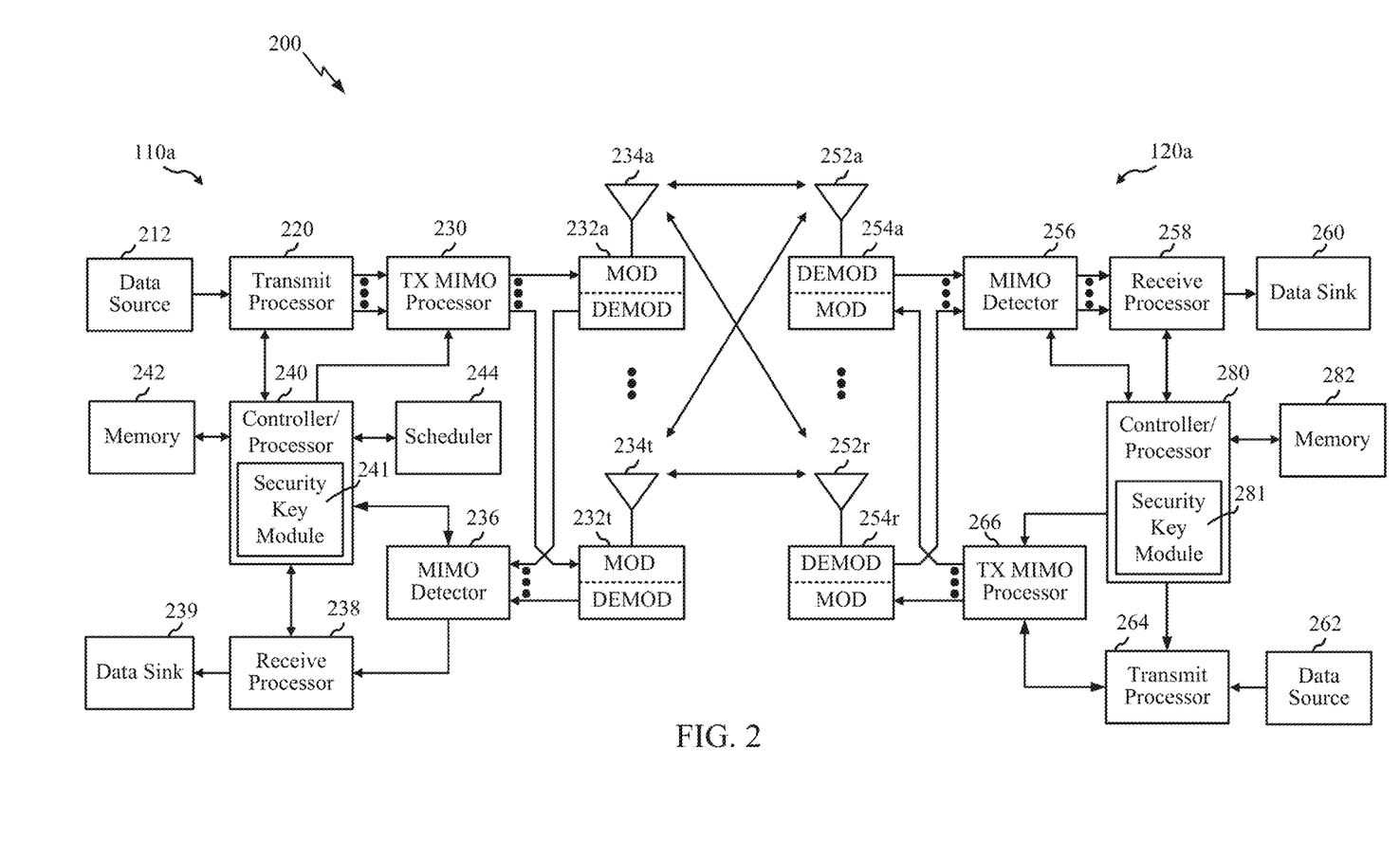
FIG. 2 is a block diagram conceptually illustrating a design of an example base station (BS) and a user equipment (UE), in accordance with certain aspects of the present disclosure.

FIG. 2 illustrates example components of a BS 110a and a UE 120a (e.g., in the wireless communication network 100 of FIG. 1).

At the BS 110a, a transmit processor 220 may receive data from a data source 212 and control information from a controller/processor 240. The control information may be for a physical broadcast channel (PBCH), a physical control format indicator channel (PCFICH), a physical hybrid automated repeat request (ARQ) indicator channel (PHICH), a physical downlink control channel (PDCCH), a group common PDCCH (GC PDCCH), etc. The data may be for a physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The transmit processor 220 may process (e.g., encode and symbol map) the data and control information to obtain data symbols and control symbols, respectively. The transmit processor 220 may also generate reference symbols, such as for a primary synchronization signal (PSS), a secondary synchronization signal (SSS), and a channel state information reference signal (CSI-RS). A transmit multiple-input multiple-output (MIMO) processor 230 may perform spatial processing (e.g., precoding) on the data symbols, the control symbols, and/or the reference symbols, if applicable, and may provide output symbol streams to modulators (MODs) in transceivers 232a-232t. Each MOD in transceivers 232a-232t may process a respective output symbol stream (e.g., for OFDM, etc.) to obtain an output sample stream. Each MOD in transceivers 232a-232t may further process (e.g., convert to analog, amplify, filter, and upconvert) the output sample stream to obtain a downlink signal. The downlink signals from the MODs in transceivers 232a-232t may be transmitted via antennas 234a-234t, respectively.

At the UE 120a, antennas 252a-252r may receive the downlink signals from the BS 110a and may provide received signals to demodulators (DEMODs) in transceivers 254a-254r, respectively. Each DEMOD in the transceiver 254 may condition (e.g., filter, amplify, downconvert, and digitize) a respective received signal to obtain input samples. Each DEMOD in the transceiver 254 may further process the input samples (e.g., for OFDM, etc.) to obtain received symbols. A MIMO detector 256 may obtain received symbols from all the DEMODs in the transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at the UE 120a, a transmit processor 264 may receive and process data (e.g., for a physical uplink shared channel (PUSCH)) from a data source 262 and control information (e.g., for a physical uplink control channel (PUCCH) from the controller/processor 280. The transmit processor 264 may also generate reference symbols for a reference signal (e.g., for a sounding reference signal (SRS)). The symbols from the transmit processor 264 may be precoded by a transmit MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the DEMODs in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

Memories 242 and 282 may store data and program codes for the BS 110 and the UE 120, respectively. A scheduler 244 may schedule the UEs 120 data transmission on a downlink and/or an uplink.

Antennas 252, processors 266, 258, 264, and/or controller/processor 280 of the UE 120a and/or antennas 234, processors 220, 230, 238, and/or controller/processor 240 of the BS 110a may be used to perform various techniques and methods described herein for determining a cryptographic key based on channel parameters associated with a channel corresponding to a TX and RX beam pair between two wireless devices. For example, as shown in FIG. 2, the controller/processor 240 of the BS 110a includes a security key module 241 that may be configured to perform the operations illustrated in FIG. 5, as well as other operations disclosed herein for determining a cryptographic key based on channel parameters associated with a channel corresponding to a TX and RX beam pair between two wireless devices, in accordance with aspects of the present disclosure. As shown in FIG. 2, the controller/processor 280 of the UE 120a includes a security key module 281 that may be configured to perform the operations illustrated in FIG. 5, as well as other operations disclosed herein for determining a cryptographic key based on channel parameters associated with a channel corresponding to a TX and RX beam pair between two wireless devices, in accordance with aspects of the present disclosure. Although shown at the controller/processor, other components of the UE 120a and the BS 110a may be used performing the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
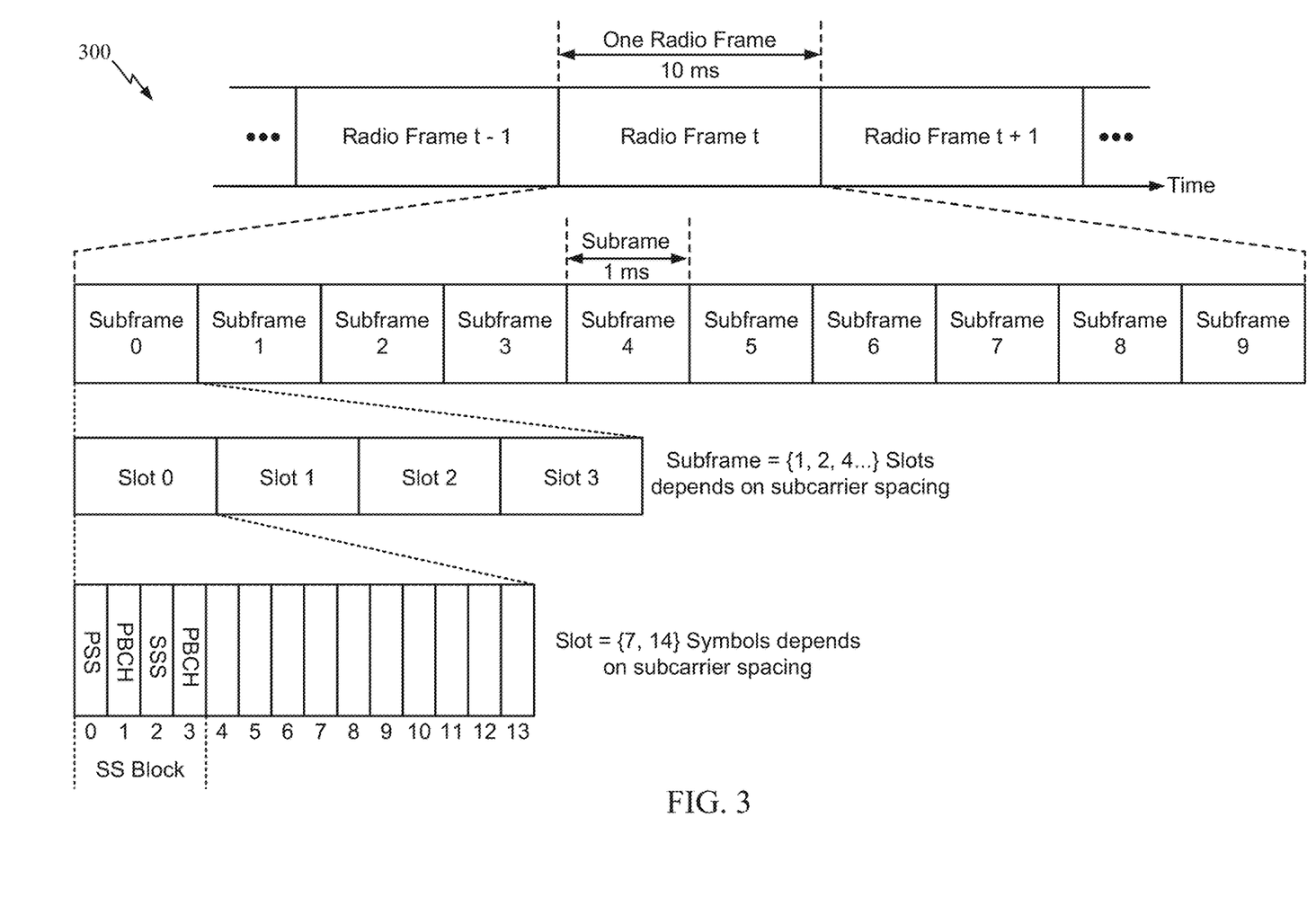
FIG. 3 is an example frame format for certain wireless communication systems (e.g., a new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A sub-slot structure refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc.

Further system information such as, remaining minimum system information (RMSI), system information blocks (SIBs), other system information (OSI) can be transmitted on a physical downlink shared channel (PDSCH) in certain subframes.

The SS blocks may be organized into SS burst sets to support beam sweeping. As shown, each SSB within a burst set may be transmitted using a different beam, which may help a UE quickly acquire both TX and RX beams (particular for mmW applications). A physical cell identity (PCI) may still decoded from the PSS and SSS of the SSB.

Certain deployment scenarios may include one or both NR deployment options. Some may be configured for non-standalone (NSA) and/or standalone (SA) option. A standalone cell may broadcast both SSB and remaining minimum system information (RMSI), for example, with SIB1 and SIB2. A non-standalone cell may only broadcast SSB, without broadcasting RMSI. In a single carrier in NR, multiple SSBs may be sent in different frequencies, and may include the different types of SSB.

Example Beam Forming and Management Procedures

In $5^{th}$ generation (5G) new radio (NR), various beam forming and management procedures may be used for determining and maintaining beam pair links (BPLs).

Figure 4:
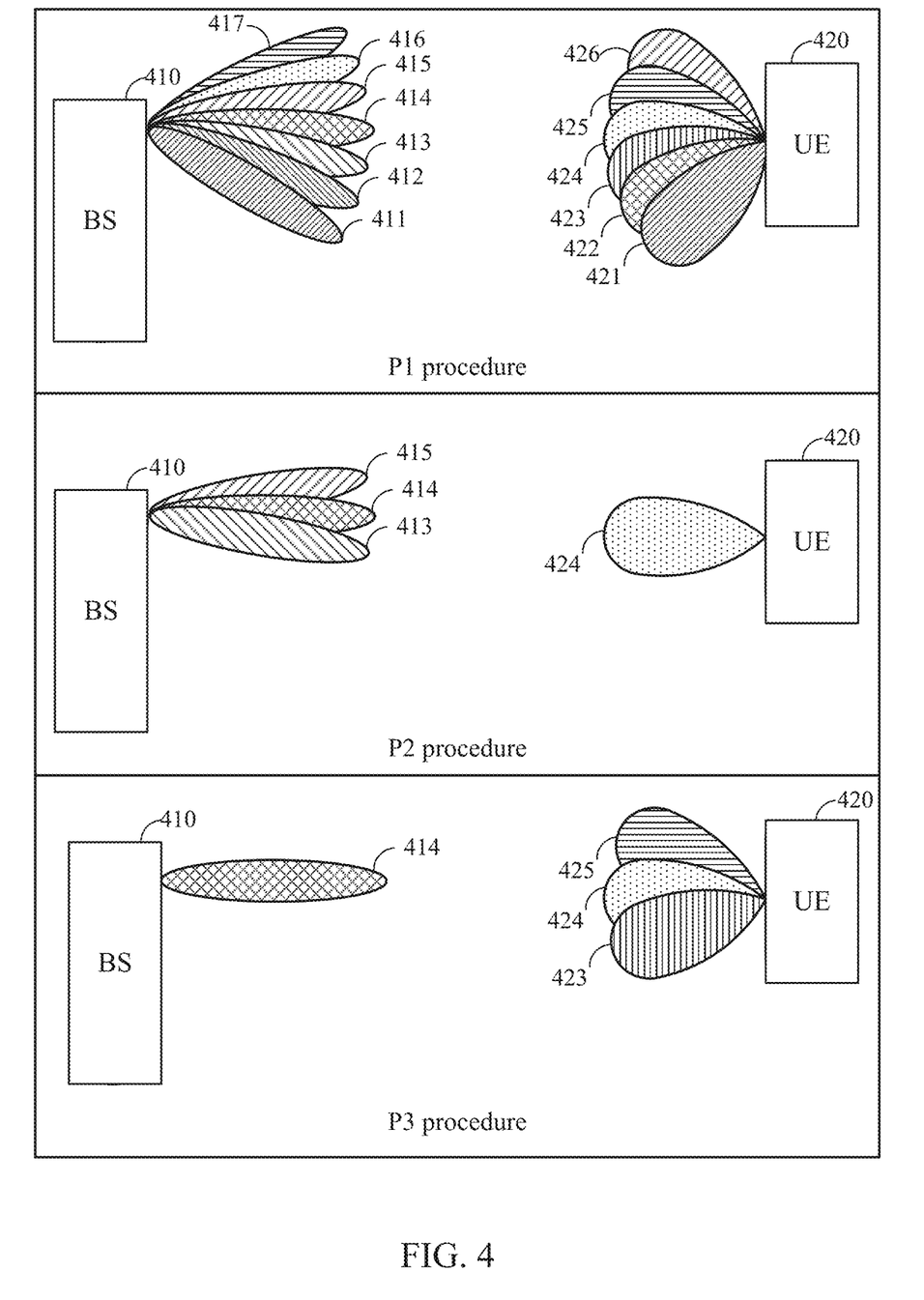
FIG. 4 illustrates example beam forming and management procedures, in accordance with certain aspects of the present disclosure.

For example, FIG. 4 illustrates an example procedure, referred to as a P1 procedure. A base station (BS) 410 (e.g., such as the BS 110a in FIG. 1 or FIG. 2) may send a measurement request to a user equipment (UE) 420 (e.g., such as the UE 120a in FIG. 1 or FIG. 2), and may subsequently transmit one or more signals (sometimes referred to as a "P1-signal") to the UE 420 for measurement. In the P1 procedure, the BS 410 transmits a signal with beam forming in a different spatial direction (corresponding to a transmit (TX) beam 411, 412, . . . , 417) in each symbol, such that several (e.g., most or all) relevant spatial locations of a cell of the BS 410 are reached. In this manner, the BS 410 transmits the signal using different transmit beams over time in different directions. In some examples, a synchronization signal block (SSB) is used as the P1-signal. In some examples, channel state information reference signal (CSI-RS), demodulation reference signal (DMRS), or another downlink signal can be used as the P1-signal.

In the P1 procedure, to successfully receive at least a symbol of the P1-signal, the UE 420 finds (e.g., determines/selects) an appropriate receive (RX) beam (421, 422, . . . , 426). Signals (e.g., SSBs) from multiple BSs can be measured simultaneously for a given signal index (e.g., a SSB index) corresponding to a given time period. The UE 420 can apply a different receive beam during each occurrence (e.g., each symbol) of the P1-signal. Once the UE 420 succeeds in receiving a symbol of the P1-signal, the UE 420 and the BS 410 have discovered a BPL (i.e., the UE RX beam used to receive the P1-signal in the symbol and the BS TX beam used to transmit the P1-signal in the symbol). In some cases, the UE 420 does not search all of its possible UE RX beams until the UE 420 finds a best UE RX beam, since this causes additional delay. Instead, the UE 420 may select a RX beam once the RX beam is "good enough", for example, having a quality (e.g., a signal to noise ratio (SNR) or a signal to interference and noise ratio (SINR)) that satisfies a threshold (e.g., a predefined threshold). The UE 420 may not know which beam the BS 410 used to transmit the P1-signal in a symbol; however, the UE 420 may report to the BS 410 the time at which it observed the signal. For example, the UE 420 may report a symbol index in which the P1-signal was successfully received to the BS 410. The BS 410 may receive this report and determine which BS TX beam the BS 410 used at the indicated time. In some examples, the UE 420 measures signal quality of the P1-signal, such as a reference signal receive power (RSRP) or another signal quality parameter (e.g., a SNR, a channel flatness, etc.). The UE 420 may report the measured signal quality (e.g., a RSRP) to the BS 410 together with the symbol index. In some cases, the UE 420 may report multiple symbol indices to the BS 410, corresponding to multiple BS TX beams.

As a part of a beam forming and management procedure, the BPL used between the UE 420 and the BS 410 may be refined/changed. For example, the BPL may be refined periodically to adapt to changing channel conditions, for example, due to movement of the UE 420 or other objects, fading due to Doppler spread, etc. The UE 420 can monitor a quality of the BPL (e.g., a BPL found/selected during the P1 procedure and/or a previously refined BPL) to refine the BPL when the quality drops (e.g., when the BPL quality drops below a threshold or when another BPL has a higher quality). In 5G NR, the beam forming and management procedures for the beam refinement of the BPLs may be referred to as a P2 procedure and a P3 procedure to refine a BS-beam and a UE-beam, respectively, of an individual BPL.

As shown in FIG. 4, for the P2 procedure, the BS 410 transmits symbols of a signal with different BS-beams (e.g., TX beams 415, 414, 413) that are spatially close to the B S-beam of the current BPL. For example, the BS 410 transmits the signal in different symbols using neighboring TX beams (e.g., beam sweeps) around the TX beam of the current BPL. As shown in FIG. 4, the TX beams used by the BS 410 for the P2 procedure may be different from the TX beams used by the BS 410 for the P1 procedure. For example, the TX beams used by the BS 410 for the P2 procedure may be spaced closer together and/or may be more focused (e.g., narrower) than the TX beams used by the BS 410 for the P1 procedure. During the P2 procedure, the UE 420 keeps its RX beam (e.g., RX beam 424) constant. The UE 420 may measure the signal quality (e.g., a RSRP) of the signal in the different symbols and indicate the symbol in which the highest signal quality was measured. Based on the indication, the BS 410 can determine the strongest (e.g., best, or associated with the highest signal quality) TX beam (i.e., the TX beam used in the indicated symbol). The BPL can be refined accordingly to use the indicated TX beam.

As shown in FIG. 4, for the P3 procedure, the BS 420 maintains a constant TX beam (e.g., the TX beam of the current BPL) and transmits symbols of a signal using the constant TX beam (e.g., TX beam 414). During the P3 procedure, the UE 420 scans the signal using different RX beams (e.g., RX beams 423, 424, 425) in different symbols. For example, the UE 420 may perform a sweep using neighboring RX beams to the RX beam in the current BPL (i.e., the BPL being refined). The UE 420 may measure the signal quality (e.g., a RSRP) of the signal for each RX beam and identify the strongest UE RX beam. The UE 420 may use the identified RX beam for the BPL. The UE 420 may report the signal quality to the BS 410.

Example Spatial Physical Layer Security

Wireless devices, such as a UE and a base station (e.g., an eNB/gNB) may employ a security system for establishing secure communication with each other. For example, the wireless devices may use secret (cryptographic) keys, which may work with security algorithms for encryption and decryption of messages exchanged between the wireless devices.

These secret keys may be exchanged between the wireless devices. To enable this exchange of the secret keys, a key exchange session is implemented between the wireless devices. For example, a first wireless device may send an invitation to the key exchange session to a second wireless device. The invitation may include a session identifier. When the invitation is accepted by the second wireless device, the first wireless device and the second wireless device may perform a handshake and share the secret keys. The first wireless device and the second wireless device may use the secret keys to encrypt and decrypt the messages shared between them.

The key exchange session represents a potential weakness in a protocol level of the security system, which an unauthorized eavesdropper may exploit. This is because the unauthorized eavesdropper may intercept over the air data exchanged during the key exchange session and obtain information such as the secret keys shared during the key exchange session.

Aspects of the present disclosure may help address this potential weakness by providing a technique whereby two wireless devices independently generate cryptographic keys to provide secure communications without requiring to share the cryptographic keys with each other via a key exchange session. For example, the technique relies on using channel information associated with a same estimated channel between the two wireless devices that is known exclusively to the two wireless devices as the cryptographic keys. The wireless devices may use the cryptographic keys to encrypt and decrypt messages exchanged between them. This technique provides a simplified way for each wireless device to individually set up the cryptographic keys in a secure way without participating in any key exchange session that may be intercepted by an unauthorized eavesdropper.

Figure 5:
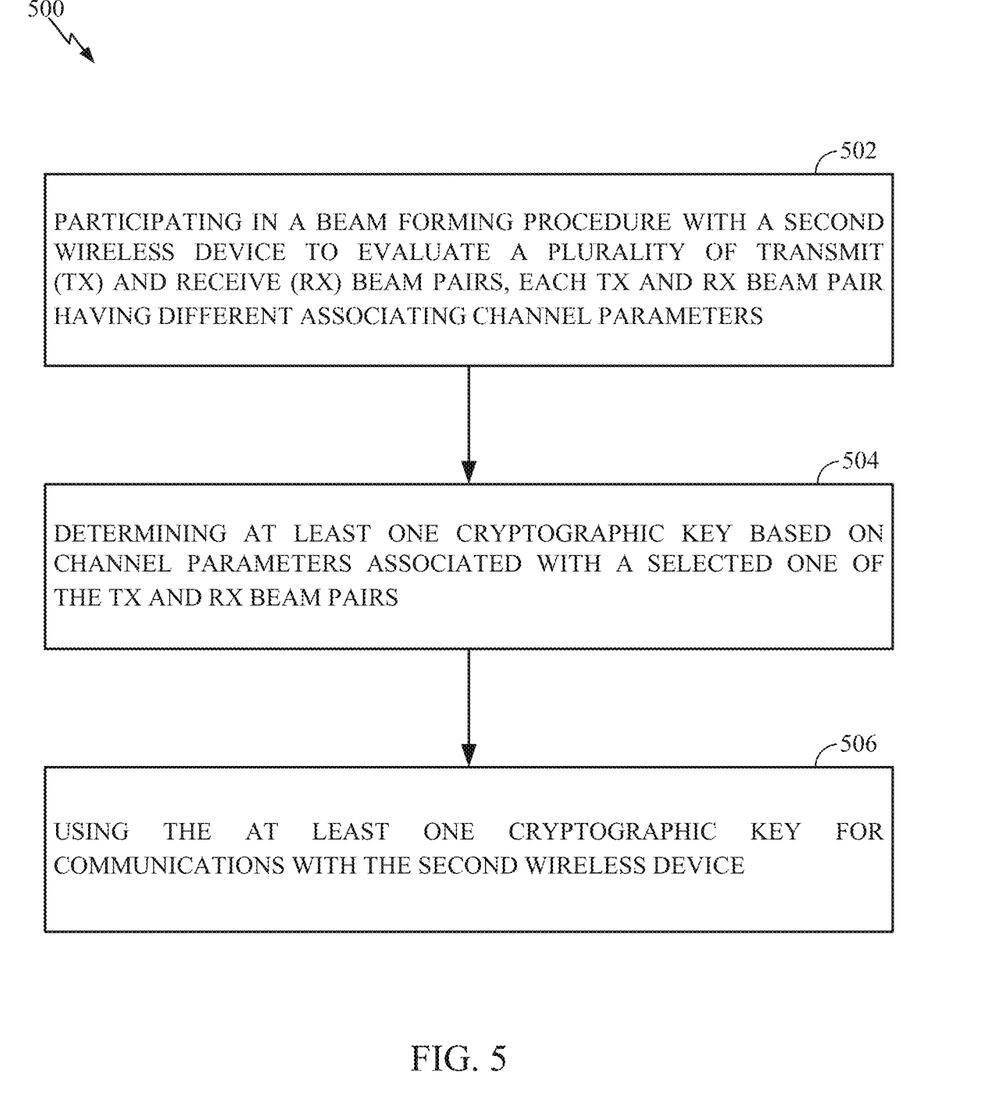
FIG. 5 is a flow diagram illustrating example operations for wireless communication by a first wireless device, in accordance with certain aspects of the present disclosure.

FIG. 5 is a flow diagram illustrating example operations 500 for wireless communication. Operations 500 may be performed by a first wireless device to determine a cryptographic key based on a spatial beamformed multiple-input multiple-output (MIMO) multipath channel between the first wireless device and a second wireless device, in accordance with aspects of the present disclosure.

In certain aspects, the first wireless device may be a UE (e.g., such as the UE 120a in FIG. 1 or FIG. 2) and the second wireless device may be a BS (e.g., such as the BS 110a in FIG. 1 or FIG. 2). In certain aspects, the first wireless device may be a BS and the second wireless device may be a UE. In certain aspects, the first wireless device may be a first UE and the second wireless device may be a second UE.

Operations 500 begin, at 502, by participating in a beam forming procedure with the second wireless device to evaluate a plurality of TX and RX beam pairs. Each TX and RX beam pair have different associating channel parameters.

At 504, the first wireless device selects one of the TX and RX beam pairs based on the evaluation of the plurality of TX and RX beam pairs, and determines at least one cryptographic key based on channel parameters associated with a selected one of the TX and RX beam pairs.

At 506, the first wireless device uses the at least one cryptographic key for communications with the second wireless device.

Figure 6:
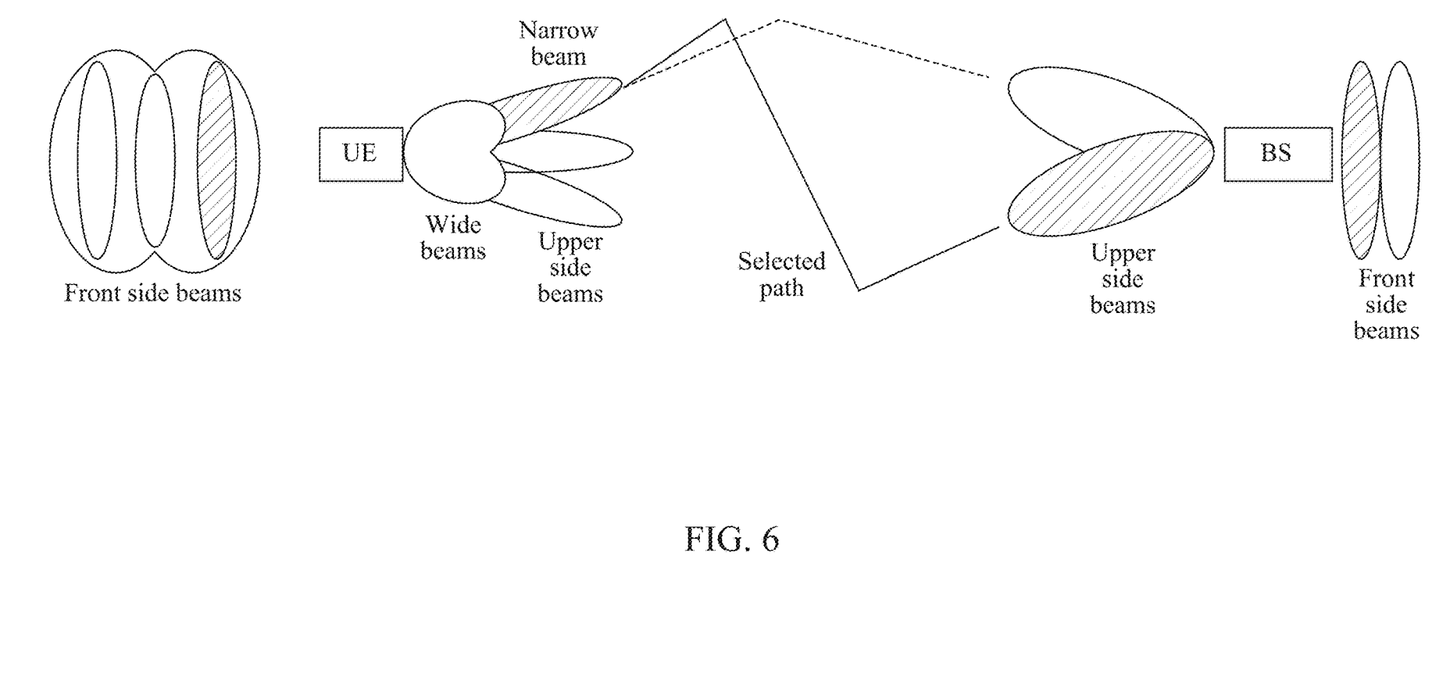
FIG. 6 illustrates example beam forming and management procedures, in accordance with certain aspects of the present disclosure.

Operations 500 shown in FIG. 5 may be understood with reference to FIG. 6.

As illustrated in FIG. 6, communication between a first wireless device (e.g., a UE) and a second wireless device (e.g., a BS) is established via a MIMO system. The MIMO system may employ multiple transmit antennas and multiple receive antennas for data and signal transmission between the first wireless device and the second wireless device. These antennas can relate to both the first wireless device and the second wireless device allowing bi-directional communication between the first wireless device and the second wireless device.

As noted above, at a beginning of a wireless communication session between the first wireless device and the second wireless device, the first wireless device may participate in a beam forming procedure with the second wireless device. During the beam forming procedure, the first wireless device may transmit to the second wireless device using multiple TX beams and/or receive from the second wireless device using multiple RX beams. The multiple TX beams may include beams (such as wide or narrow beams) per spatial beam index (e.g., from basis beam forming functions) from antennas of the first wireless device that may span both elevation and azimuth planes. The multiple RX beams may include beams (such as wide or narrow beams) per spatial beam index (e.g., from basis beam forming functions) from antennas of the second wireless device that may span in both elevation and azimuth planes.

In certain aspects, the first wireless device may perform precoding of signals to provide beam forming when transmitting the signals. In this context, precoding generally refers to a preprocessing technique to support multi-layer (e.g., multi-stream) transmission. The precoding may exploit transmit diversity and increase throughput in multi-antenna wireless communications by applying weighting to information stream (e.g., a layer). The precoding applies precoders to map each layer to one or more wireless device antenna ports (e.g., logical channel ports that can be spread across a single or multiple antennas). The precoded layers may then be mapped to resource elements, and the signal may be generated and transmitted via the corresponding antenna ports.

In certain aspects, the first wireless device may randomly apply different precoders to construct the multiple TX beams, which may make it difficult for an unauthorized eavesdropper to estimate a precoding in a small time scale. These precoders may use a precoding matrix to steer signals over the antennas of the first wireless device. In codebook-based transmission, the first wireless device may choose the precoder for transmission and may signal the selected precoder to the second wireless device. A codebook may include vectors and matrices that may correspond to the precoders.

In certain aspects, the first wireless device may randomly apply cyclic delay diversity (CDD) between the antennas of the first wireless device to introduce spatial diversity and/or redundancy in transmitting. The CDD may operate block-wise and may apply cyclic shifts, rather than linear delays, to different antennas of the first wireless device. The antennas of the first wireless device may then operate with an antenna specific delay to transmit precoded signals with redundancy and diversity increasing successful decoding at a receiving end (e.g., the second wireless device).

The CDD may enhance channel richness by increasing a frequency diversity of an effective channel between the first wireless device and the second wireless device by transmitting from different antennas of the first wireless device delayed versions of a time domain signal simultaneously. The delays may be a few microseconds and may introduce frequency dependent phase shifts. The values of the cyclic delays to the different antennas of the first wireless device may depend on different bandwidths and/or channel conditions.

In certain aspects, the first wireless device and the second wireless device may select TX and RX beams based on the basis beam forming functions. In certain aspects, the first wireless device and the second wireless device may randomly select different TX and RX beams. Each different TX and RX beam pair between the first wireless device and the second wireless device may introduce a different channel.

In certain aspects, the first wireless device and the second wireless device may estimate a same channel corresponding to the selected one of the TX and RX beam pairs between the first wireless device and the second wireless device based on channel reciprocity. For example, the first wireless device and the second wireless device may estimate the channel between a transmit panel of the first wireless device and a receive panel of the second wireless device based on a channel reciprocity assumption (assuming an uplink channel is same as a downlink channel). The estimated channel corresponding to the selected one of the TX and RX beam pairs between the first wireless device and the second wireless device may be associated with channel parameters. The channel parameters may include a phase, an amplitude, a timing offset, and/or a frequency offset.

In certain aspects, the first wireless device and the second wireless device may quantize the channel parameters associated with the estimated channel to generate a quantized output. As used herein, quantizing generally refers to mapping the large/infinite possible values of the channel parameters (or combinations thereof) to a smaller set of discrete values), which may help ensure the wireless devices select the same key values. The first wireless device and the second wireless device may determine at least one cryptographic key based on the quantized output. Since both the first wireless device and the second wireless device may determine the at least one cryptographic key based on the quantized output that is known exclusively to them, the first wireless device and the second wireless device don't need to share this cryptographic key with each other.

In certain aspects, the first wireless device and the second wireless device may compress the channel parameters associated with the estimated channel to generate a compressed output. The first wireless device and the second wireless device may execute a principal component analysis technique to compress the channel parameters. Both the first wireless device and the second wireless device may determine the at least one cryptographic key based on the compressed output and therefore there is no need of sharing this cryptographic key with each other.

In certain aspects, the first wireless device and the second wireless device may use the at least one cryptographic key for encrypting original plaintext to produce encrypted information and decrypting the encrypted information to produce reconstituted plaintext.

The system described herein may have several advantages. First, an eavesdropper located in a different physical location may not be able to estimate a true channel between a first wireless device and a second wireless device, and therefore may not be able to determine a cryptographic key that is based on channel parameters associated with the channel. This is because the eavesdropper may not know a beam selected by a receiver (e.g., the second wireless device) and would likely experience (see) different channel characteristics. Second, the selected TX and RX beams by the first wireless device and the second wireless device may not limit operational performance of the system since the selected TX and RX beams may only be used for data encryption/decryption purpose. Third, a time variant behavior of the channel between the first wireless device and the second wireless device may allow for periodic updates of the channel parameters. This may cause periodic update of the cryptographic key since it is based on the channel parameters. The periodic update of the cryptographic key will mean that even if the eavesdropper has found an old cryptographic key, it will no longer be relevant or useful (become stale). Fourth, sidelink communication that is not based on subscriber identify module (SIM) protection as in UE-to-UE and UE-to-IoT devices (e.g., smart home, dynamic gaming devices, etc.) may be protected through a physical layer.

Figure 7:
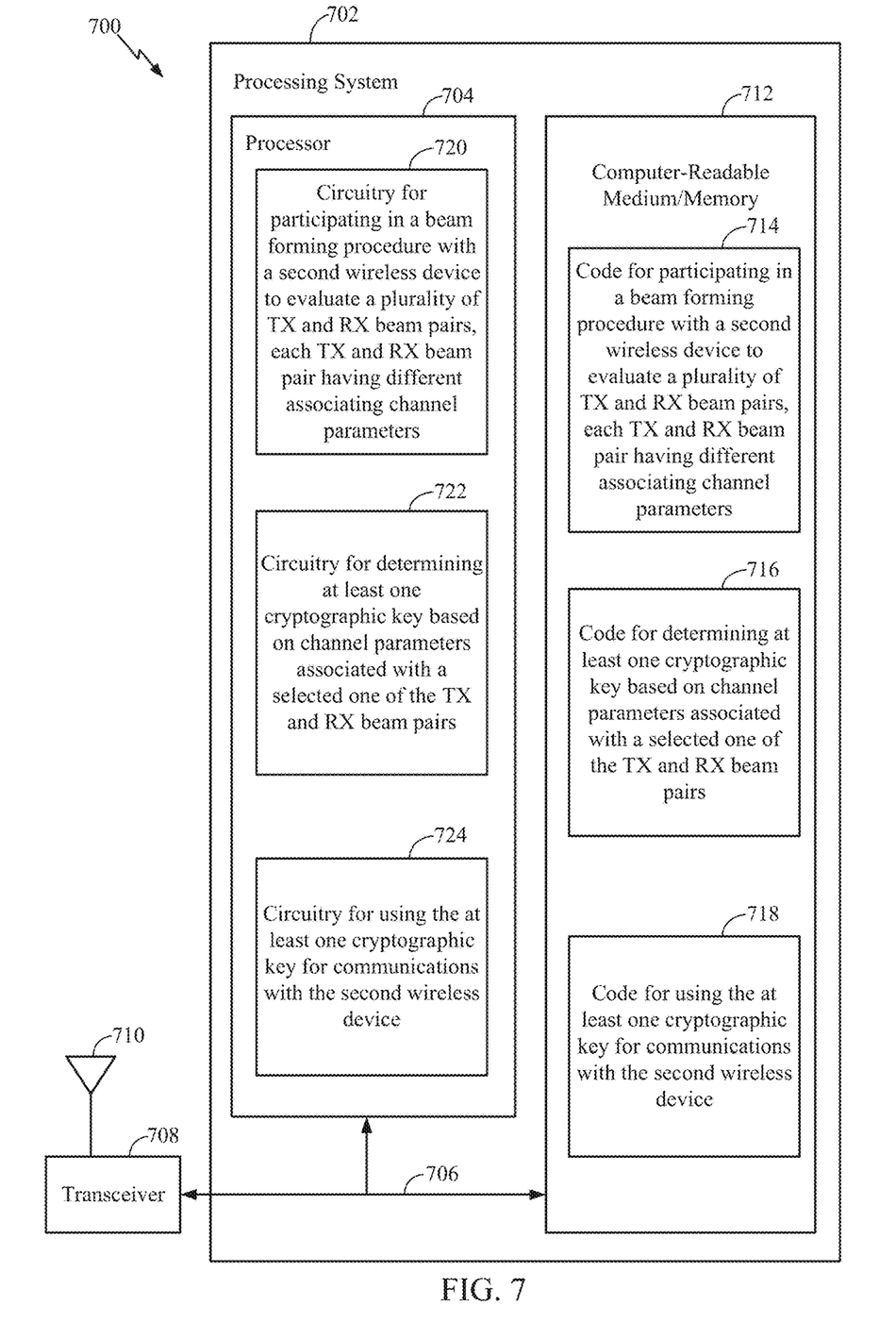
FIG. 7 illustrates a communications device that may include various components configured to perform operations for techniques disclosed herein, in accordance with aspects of the present disclosure.

FIG. 7 illustrates a communications device 700 that may include various components (e.g., corresponding to means-plus-function components) configured to perform operations for techniques disclosed herein, such as the operations illustrated in FIG. 5. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 is configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 5, or other operations for determining a cryptographic key based on channel parameters associated with a channel corresponding to a TX and RX beam pair between two wireless devices. In certain aspects, computer-readable medium/memory 712 stores code 714 for participating, code 716 for determining, and code 718 for using. The code 714 for participating may include code for participating in a beam forming procedure with a second wireless device to evaluate a plurality of TX and RX beam pairs where each TX and RX beam pair having different associating channel parameters. The code 716 for determining may include code for determining at least one cryptographic key based on channel parameters associated with a selected one of the TX and RX beam pairs. The code 718 for using may include code for using the at least one cryptographic key for communications with the second wireless device.

The processor 714 may include circuitry configured to implement the code stored in the computer-readable medium/memory 712, such as for performing the operations illustrated in FIG. 5, as well as other operations for determining a cryptographic key based on channel parameters associated with a channel corresponding to a TX and RX beam pair between two wireless devices. For example, the processor 704 includes circuitry 720 for participating, circuitry 722 for determining, and circuitry 718 for using. The circuitry 720 for participating may include circuitry for participating in a beam forming procedure with a second wireless device to evaluate a plurality of TX and RX beam pairs where each TX and RX beam pair having different associating channel parameters. The circuitry 722 for determining may include circuitry for determining at least one cryptographic key based on channel parameters associated with a selected one of the TX and RX beam pairs. The circuitry 724 for using may include circuitry for using the at least one cryptographic key for communications with the second wireless device.

Example Aspects

In a first aspect, a method for wireless communications by a first wireless device comprises participating in a beam forming procedure with a second wireless device to evaluate a plurality of TX and RX beam pairs where each TX and RX beam pair have different associating channel parameters; determining at least one cryptographic key based on channel parameters associated with a selected one of the TX and RX beam pairs; and using the at least one cryptographic key for communications with the second wireless device.

In a second aspect, alone or in combination with the first aspect, the channel parameters associated with the selected one of the TX and RX beam pairs comprises at least one of a phase, an amplitude, a timing offset, or a frequency offset.

In a third aspect, alone or in combination with one or more of the first and second aspects, quantizing the channel parameters associated with the selected one of the TX and RX beam pairs to generate a quantized output, wherein the at least one cryptographic key is determined based on the quantized output.

In a fourth aspect, alone or in combination with one or more of the first through third aspects, compressing the channel parameters associated with the selected one of the TX and RX beam pairs to generate a compressed output, wherein the at least one cryptographic key is determined based on the compressed output.

In a fifth aspect, alone or in combination with one or more of the first through fourth aspects, estimating a channel corresponding to the selected one of the TX and RX beam pairs between the first wireless device and the second wireless device based on a channel reciprocity, wherein the channel parameters are associated with the estimated channel.

In a sixth aspect, alone or in combination with one or more of the first through fifth aspects, selecting the one of the TX and RX beam pairs from the plurality of TX and RX beam pairs based on the evaluation of the plurality of TX and RX beam pairs.

In a seventh aspect, alone or in combination with one or more of the first through sixth aspects, using the at least one cryptographic key for the communications with the second wireless device comprises encrypting original plaintext using the at least one cryptographic key to produce encrypted information and decrypting the encrypted information using the at least one cryptographic key to produce reconstituted plaintext.

In an eighth aspect, alone or in combination with one or more of the first through seventh aspects, participating in the beam forming procedure with the second wireless device comprises at least one of transmitting using multiple TX beams or receiving using multiple RX beams.

In a ninth aspect, alone or in combination with one or more of the first through eighth aspects, the multiple TX beams comprise multiple TX beams per spatial beam index from basis beam forming functions from antennas of the first wireless device to the second wireless device.

In a tenth aspect, alone or in combination with one or more of the first through ninth aspects, transmitting using the multiple TX beams comprises applying different precoders to construct the multiple TX beams.

In an eleventh aspect, alone or in combination with one or more of the first through tenth aspects, transmitting the multiple TX beams comprises randomly applying CDD between antennas of the first wireless device to introduce spatial diversity.

In a twelfth aspect, alone or in combination with the first aspect, the first wireless device comprises a UE and the second wireless device comprises a network entity.

In a thirteenth aspect, alone or in combination with the first aspect, the first wireless device comprises a network entity and the second wireless device comprises a UE.

In a fourteenth aspect, an apparatus for wireless communications comprises a first wireless device having a memory and a processor coupled to the memory, the processor configured to participate in a beam forming procedure with a second wireless device to evaluate a plurality of TX and RX beam pairs, each TX and RX beam pair having different associating channel parameters; determine at least one cryptographic key based on channel parameters associated with a selected one of the TX and RX beam pairs; and use the at least one cryptographic key for communications with the second wireless device.

In a fifteenth aspect, alone or in combination with the fourteenth aspect, the channel parameters associated with the selected one of the TX and RX beam pairs comprises at least one of a phase, an amplitude, a timing offset, or a frequency offset.

In a sixteenth aspect, alone or in combination with one or more of the fourteenth and fifteenth aspects, the processor is further configured to quantize the channel parameters associated with the selected one of the TX and RX beam pairs to generate a quantized output, wherein the at least one cryptographic key is determined based on the quantized output.

In a seventeenth aspect, alone or in combination with one or more of the fourteenth through sixteenth aspects, the processor is further configured to compress the channel parameters associated with the selected one of the TX and RX beam pairs to generate a compressed output, wherein the at least one cryptographic key is determined based on the compressed output.

In an eighteenth aspect, alone or in combination with one or more of the fourteenth through seventeenth aspects, the processor is further configured to estimate a channel corresponding to the selected one of the TX and RX beam pairs between the first wireless device and the second wireless device based on a channel reciprocity, wherein the channel parameters are associated with the estimated channel.

In a nineteenth aspect, alone or in combination with one or more of the fourteenth through eighteenth aspects, the processor is further configured to select the one of the TX and RX beam pairs from the plurality of TX and RX beam pairs based on the evaluation of the plurality of TX and RX beam pairs.

In a twentieth aspect, alone or in combination with one or more of the fourteenth through nineteenth aspects, the processor is further configured to encrypt original plaintext using the at least one cryptographic key to produce encrypted information and decrypt the encrypted information using the at least one cryptographic key to produce reconstituted plaintext.

In a twenty-first aspect, alone or in combination with one or more of the fourteenth through twentieth aspects, the processor is further configured to transmit using multiple TX beams or receive using multiple RX beams.

In a twenty-second aspect, alone or in combination with one or more of the fourteenth through twenty-first aspects, the multiple TX beams comprise multiple TX beams per spatial beam index from basis beam forming functions from antennas of the first wireless device to the second wireless device.

In a twenty-third aspect, alone or in combination with one or more of the fourteenth through twenty-second aspects, the processor is further configured to apply different precoders to construct the multiple TX beams.

In a twenty-fourth aspect, alone or in combination with one or more of the fourteenth through twenty-second aspects, the processor is further configured to randomly apply CDD between antennas of the first wireless device to introduce spatial diversity.

In a twenty-fifth aspect, alone or in combination with one or more of the fourteenth through twenty-second aspects, the first wireless device comprises a UE and the second wireless device comprises a network entity.

In a twenty-sixth aspect, alone or in combination with one or more of the fourteenth through twenty-fifth aspects, wherein the first wireless device comprises a network entity and the second wireless device comprises a UE.

In a twenty-seventh aspect, an apparatus for wireless communications by a first wireless device comprising means for participating in a beam forming procedure with a second wireless device to evaluate a plurality of TX and RX beam pairs, each TX and RX beam pair having different associating channel parameters; means for determining at least one cryptographic key based on channel parameters associated with a selected one of the TX and RX beam pairs; and means for using the at least one cryptographic key for communications with the second wireless device.

In a twenty-eighth aspect, alone or in combination with the twenty-seventh aspect, the channel parameters associated with the selected one of the TX and RX beam pairs comprises at least one of a phase, an amplitude, a timing offset, or a frequency offset.

In a twenty-ninth aspect, a non-transitory computer-readable medium storing code for wireless communication at a first wireless device, the code comprising instructions executable by a processor to participate in a beam forming procedure with a second wireless device to evaluate a plurality of TX and RX beam pairs, each TX and RX beam pair having different associating channel parameters; determine at least one cryptographic key based on channel parameters associated with a selected one of the TX and RX beam pairs; and use the at least one cryptographic key for communications with the second wireless device.

In a thirtieth aspect, alone or in combination with the twenty-ninth aspect, the channel parameters associated with the selected one of the TX and RX beam pairs comprises at least one of a phase, an amplitude, a timing offset, or a frequency offset.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as universal terrestrial radio access (UTRA), cdma2000, etc. UTRA includes wideband CDMA (WCDMA) and other variants of CDMA. cdma2000 covers IS-2000, IS-95 and IS-856 standards. A TDMA network may implement a radio technology such as global system for mobile communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of universal mobile telecommunication system (UMTS). LTE and LTE-A are releases of UMTS that use E-UTRA. UTRA, E-UTRA, UMTS, LTE, LTE-A and GSM are described in documents from an organization named "3rd generation partnership project" (3GPP). cdma2000 and UMB are described in documents from an organization named "3rd generation partnership project 2" (3GPP2). NR is an emerging wireless communications technology under development.

In 3GPP, the term "cell" can refer to a coverage area of a Device B (NB) and/or a NB subsystem serving this coverage area, depending on the context in which the term is used. In NR systems, the term "cell" and BS, next generation DeviceB (gNB or gDeviceB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a wireless device, a wireless communications device, a wireless device, a wireless communications device, a terminal, an access terminal, a subscriber unit, a station, a customer premises equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless device may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless device, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., a RAM, a ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a first wireless device, comprising:
    participating in a beam forming procedure with a second wireless device to evaluate a plurality of transmit (TX) and receive (RX) beam pairs, each TX and RX beam pair having different associating channel parameters, wherein participating in the beam forming procedure comprises at least one of: transmitting using multiple TX beams or receiving using multiple RX beams, and wherein transmitting using the multiple TX beams comprises applying different precoders to construct the multiple TX beams;
    determining at least one cryptographic key based on channel parameters associated with a selected one of the TX and RX beam pairs; and
    using the at least one cryptographic key for communications with the second wireless device;
    wherein the multiple TX beams comprise multiple TX beams per spatial beam index from basis beam forming functions from antennas of the first wireless device to the second wireless device.

2. The method of claim 1, wherein the channel parameters associated with the selected one of the TX and RX beam pairs comprises at least one of a phase, an amplitude, a timing offset, or a frequency offset.

3. The method of claim 1, further comprising:
    quantizing the channel parameters associated with the selected one of the TX and RX beam pairs to generate a quantized output, wherein the at least one cryptographic key is determined based on the quantized output.

4. The method of claim 1, further comprising:
    compressing the channel parameters associated with the selected one of the TX and RX beam pairs to generate a compressed output, wherein the at least one cryptographic key is determined based on the compressed output.

5. The method of claim 1, further comprising:
    estimating a channel corresponding to the selected one of the TX and RX beam pairs between the first wireless device and the second wireless device based on a channel reciprocity, wherein the channel parameters are associated with the estimated channel.

6. The method of claim 1, further comprising:
    selecting the one of the TX and RX beam pairs from the plurality of TX and RX beam pairs based on the evaluation of the plurality of TX and RX beam pairs.

7. The method of claim 1, wherein using the at least one cryptographic key for the communications with the second wireless device comprises:
    encrypting original plaintext using the at least one cryptographic key to produce encrypted information; and
    decrypting the encrypted information using the at least one cryptographic key to produce reconstituted plaintext.

8. The method of claim 1, wherein transmitting the multiple TX beams further comprises:
    randomly applying cyclic delay diversity (CDD) between antennas of the first wireless device to introduce spatial diversity.

9. The method of claim 1, wherein the first wireless device comprises a user equipment (UE) and the second wireless device comprises a network entity.

10. The method of claim 1, wherein the first wireless device comprises a network entity and the second wireless device comprises a user equipment (UE).

11. An apparatus for wireless communications, comprising:
    a first wireless device having a memory and a processor coupled to the memory, the processor configured to:
        participate in a beam forming procedure with a second wireless device to evaluate a plurality of transmit (TX) and receive (RX) beam pairs, each TX and RX beam pair having different associating channel parameters, wherein participate in the beam forming procedure comprises at least one of: transmit using multiple TX beams or receive using multiple RX beams, and wherein transmit using the multiple TX beams comprises apply different precoders to construct the multiple TX beams;
        determine at least one cryptographic key based on channel parameters associated with a selected one of the TX and RX beam pairs; and
        use the at least one cryptographic key for communications with the second wireless device;
        wherein the multiple TX beams comprise multiple TX beams per spatial beam index from basis beam forming functions from antennas of the first wireless device to the second wireless device.

12. The apparatus of claim 11, wherein the channel parameters associated with the selected one of the TX and RX beam pairs comprises at least one of a phase, an amplitude, a timing offset, or a frequency offset.

13. The apparatus of claim 11, wherein the processor is further configured to:
quantize the channel parameters associated with the selected one of the TX and RX beam pairs to generate a quantized output, wherein the at least one cryptographic key is determined based on the quantized output.

14. The apparatus of claim 11, wherein the processor is further configured to:
compress the channel parameters associated with the selected one of the TX and RX beam pairs to generate a compressed output, wherein the at least one cryptographic key is determined based on the compressed output.

15. The apparatus of claim 11, wherein the processor is further configured to:
estimate a channel corresponding to the selected one of the TX and RX beam pairs between the first wireless device and the second wireless device based on a channel reciprocity, wherein the channel parameters are associated with the estimated channel.

16. The apparatus of claim 11, wherein the processor is further configured to:
select the one of the TX and RX beam pairs from the plurality of TX and RX beam pairs based on the evaluation of the plurality of TX and RX beam pairs.

17. The apparatus of claim 11, wherein the processor is further configured to:
encrypt original plaintext using the at least one cryptographic key to produce encrypted information; and
decrypt the encrypted information using the at least one cryptographic key to produce reconstituted plaintext.

18. The apparatus of claim 11, wherein the processor is further configured to:
randomly apply cyclic delay diversity (CDD) between antennas of the first wireless device to introduce spatial diversity.

19. The apparatus of claim 11, wherein the first wireless device comprises a user equipment (UE) and the second wireless device comprises a network entity.

20. The apparatus of claim 11, wherein the first wireless device comprises a network entity and the second wireless device comprises a user equipment (UE).

21. An apparatus for wireless communications by a first wireless device, comprising:
means for participating in a beam forming procedure with a second wireless device to evaluate a plurality of transmit (TX) and receive (RX) beam pairs, each TX and RX beam pair having different associating channel parameters, wherein participating in the beam forming procedure comprises at least one of: transmitting using multiple TX beams or receiving using multiple RX beams, and wherein transmitting using the multiple TX beams comprises applying different precoders to construct the multiple TX beams;
means for determining at least one cryptographic key based on channel parameters associated with a selected one of the TX and RX beam pairs; and
means for using the at least one cryptographic key for communications with the second wireless device;
wherein the multiple TX beams comprise multiple TX beams per spatial beam index from basis beam forming functions from antennas of the first wireless device to the second wireless device.

22. The apparatus of claim 21, wherein the channel parameters associated with the selected one of the TX and RX beam pairs comprises at least one of a phase, an amplitude, a timing offset, or a frequency offset.

23. A non-transitory computer-readable medium storing code for wireless communication at a first wireless device, the code comprising instructions executable by a processor to:
participate in a beam forming procedure with a second wireless device to evaluate a plurality of transmit (TX) and receive (RX) beam pairs, each TX and RX beam pair having different associating channel parameters, wherein participate in the beam forming procedure comprises at least one of: transmit using multiple TX beams or receive using multiple RX beams, and wherein transmit using the multiple TX beams comprises apply different precoders to construct the multiple TX beams;
determine at least one cryptographic key based on channel parameters associated with a selected one of the TX and RX beam pairs; and
use the at least one cryptographic key for communications with the second wireless device;
wherein the multiple TX beams comprise multiple TX beams per spatial beam index from basis beam forming functions from antennas of the first wireless device to the second wireless device.

24. The non-transitory computer-readable medium of claim 23, wherein the channel parameters associated with the selected one of the TX and RX beam pairs comprises at least one of a phase, an amplitude, a timing offset, or a frequency offset.

* * * * *